US009443371B2

(12) United States Patent
Vernon

(10) Patent No.: US 9,443,371 B2
(45) Date of Patent: Sep. 13, 2016

(54) MEDICATION DISPENSING CABINET, COMPUTING DEVICE AND ASSOCIATED METHOD FOR MEASURING THE FORCE APPLIED TO A DRAWER

(71) Applicant: Aesynt Incorporated, Cranberry, PA (US)

(72) Inventor: Brian Vernon, Gibsonia, PA (US)

(73) Assignee: Aesynt Incorporated, Cranberry, PA (US)

( * ) Notice: Subject to any disclaimer, the term of this patent is extended or adjusted under 35 U.S.C. 154(b) by 24 days.

(21) Appl. No.: 13/851,535

(22) Filed: Mar. 27, 2013

(65) Prior Publication Data

US 2014/0292165 A1 Oct. 2, 2014

(51) Int. Cl.
*G01L 1/00* (2006.01)
*G07F 9/02* (2006.01)
*G07F 17/00* (2006.01)

(52) U.S. Cl.
CPC ............ *G07F 9/02* (2013.01); *G07F 17/0092* (2013.01)

(58) Field of Classification Search
CPC ........................................................ G07F 9/02
USPC ........................................................... 73/760
See application file for complete search history.

(56) References Cited

U.S. PATENT DOCUMENTS

| | | | |
|---|---|---|---|
| 4,717,042 | A | 1/1988 | McLaughlin |
| 4,785,969 | A | 11/1988 | McLaughlin |
| 4,847,764 | A | 7/1989 | Halvorson |
| 5,014,875 | A | 5/1991 | McLaughlin et al. |
| 5,190,185 | A | 3/1993 | Blechl |
| 5,314,243 | A | 5/1994 | McDonald et al. |
| 5,346,297 | A | 9/1994 | Colson, Jr. et al. |
| 5,377,864 | A | 1/1995 | Blechl et al. |
| 5,405,048 | A | 4/1995 | Rogers et al. |
| 5,431,299 | A | 7/1995 | Brewer et al. |
| 5,460,294 | A | 10/1995 | Williams |
| 5,468,110 | A | 11/1995 | McDonald et al. |
| 5,480,062 | A | 1/1996 | Rogers et al. |
| 5,520,450 | A | 5/1996 | Colson, Jr. et al. |
| 5,564,803 | A | 10/1996 | McDonald et al. |
| 5,593,267 | A | 1/1997 | McDonald et al. |
| 5,661,978 | A | 9/1997 | Holmes et al. |
| D384,578 | S | 10/1997 | Wangu et al. |
| 5,713,485 | A | 2/1998 | Liff et al. |
| 5,716,114 | A | 2/1998 | Holmes et al. |
| 5,745,366 | A | 4/1998 | Higham et al. |
| 5,761,877 | A | 6/1998 | Quandt |
| 5,797,515 | A | 8/1998 | Liff et al. |

(Continued)

*Primary Examiner* — Harshad R Patel
*Assistant Examiner* — Brandi N Hopkins
(74) *Attorney, Agent, or Firm* — Alston & Bird LLP

(57) ABSTRACT

A medication dispensing cabinet, a computing device and an associated method are provided to measure the force applied to a drawer of a medication dispensing cabinet. By measuring the force applied to the drawer of a medication dispensing cabinet, certain predefined condition(s) may be detected, such as the closure of a drawer of a medication dispensing cabinet with an excessive amount of force. In this regard, a medication dispensing cabinet is provided that includes a cabinet body defining an internal cavity and a plurality of drawers disposed within the internal cavity of the cabinet body. The drawers are configured to be slidably opened and closed relative to the cabinet body. The medication dispensing cabinet also includes a force sensor carried by at least one of the cabinet body or one or more of the drawers and configured to measure force applied to a drawer of the medication dispensing cabinet.

17 Claims, 3 Drawing Sheets

(56) References Cited

U.S. PATENT DOCUMENTS

| | | | |
|---|---|---|---|
| 5,805,456 | A | 9/1998 | Higham et al. |
| 5,842,976 | A | 12/1998 | Williamson |
| 5,878,885 | A | 3/1999 | Wangu et al. |
| 5,880,443 | A | 3/1999 | McDonald et al. |
| 5,883,806 | A | 3/1999 | Meador et al. |
| 5,893,697 | A | 4/1999 | Zini et al. |
| 5,905,653 | A | 5/1999 | Higham et al. |
| 5,912,818 | A | 6/1999 | McGrady et al. |
| 5,927,540 | A | 7/1999 | Godlewski |
| 5,940,306 | A | 8/1999 | Gardner et al. |
| 5,971,593 | A | 10/1999 | McGrady |
| 6,003,006 | A | 12/1999 | Colella et al. |
| 6,011,999 | A | 1/2000 | Holmes |
| 6,021,392 | A | 2/2000 | Lester et al. |
| 6,039,467 | A | 3/2000 | Holmes |
| 6,065,819 | A | 5/2000 | Holmes et al. |
| 6,068,156 | A | 5/2000 | Liff et al. |
| 6,109,774 | A | 8/2000 | Holmes et al. |
| 6,112,502 | A | 9/2000 | Frederick et al. |
| 6,116,461 | A | 9/2000 | Broadfield et al. |
| 6,151,536 | A | 11/2000 | Arnold et al. |
| 6,170,230 | B1 | 1/2001 | Chudy et al. |
| 6,176,392 | B1 | 1/2001 | William et al. |
| 6,189,727 | B1 | 2/2001 | Shoenfeld |
| 6,223,934 | B1 | 5/2001 | Shoenfeld |
| 6,256,967 | B1 | 7/2001 | Hebron et al. |
| 6,283,322 | B1 | 9/2001 | Liff et al. |
| 6,289,656 | B1 | 9/2001 | Wangu et al. |
| 6,338,007 | B1 | 1/2002 | Broadfield et al. |
| 6,339,732 | B1 | 1/2002 | Phoon et al. |
| 6,361,263 | B1 | 3/2002 | Dewey et al. |
| 6,370,841 | B1 | 4/2002 | Chudy et al. |
| 6,449,927 | B2 | 9/2002 | Hebron et al. |
| 6,471,089 | B2 | 10/2002 | Liff et al. |
| 6,497,342 | B2 | 12/2002 | Zhang et al. |
| 6,499,270 | B2 | 12/2002 | Peroni et al. |
| 6,532,399 | B2 | 3/2003 | Mase |
| 6,564,121 | B1 | 5/2003 | Wallace et al. |
| 6,581,798 | B2 | 6/2003 | Liff et al. |
| 6,609,047 | B1 | 8/2003 | Lipps |
| 6,611,733 | B1 | 8/2003 | De La Huerga |
| 6,625,952 | B1 | 9/2003 | Chudy et al. |
| 6,640,159 | B2 | 10/2003 | Holmes et al. |
| 6,650,964 | B2 | 11/2003 | Spano, Jr. et al. |
| 6,671,579 | B2 | 12/2003 | Spano, Jr. et al. |
| 6,681,149 | B2 | 1/2004 | William et al. |
| 6,742,671 | B2 | 6/2004 | Hebron et al. |
| 6,755,931 | B2 | 6/2004 | Vollm et al. |
| 6,760,643 | B2 | 7/2004 | Lipps |
| 6,776,304 | B2 | 8/2004 | Liff et al. |
| 6,785,589 | B2 | 8/2004 | Eggenberger et al. |
| 6,790,198 | B1 | 9/2004 | White et al. |
| 6,814,254 | B2 | 11/2004 | Liff et al. |
| 6,814,255 | B2 | 11/2004 | Liff et al. |
| 6,847,861 | B2 | 1/2005 | Lunak et al. |
| 6,874,684 | B1 | 4/2005 | Denenberg et al. |
| 6,892,780 | B2 | 5/2005 | Vollm et al. |
| 6,895,304 | B2 | 5/2005 | Spano, Jr. et al. |
| 6,975,922 | B2 | 12/2005 | Duncan et al. |
| 6,985,797 | B2 | 1/2006 | Spano, Jr. et al. |
| 6,996,455 | B2 | 2/2006 | Eggenberger et al. |
| 7,010,389 | B2 | 3/2006 | Lunak et al. |
| 7,014,063 | B2 | 3/2006 | Shows et al. |
| 7,016,766 | B2 | 3/2006 | William et al. |
| 7,040,504 | B2 | 5/2006 | Broadfield et al. |
| 7,052,097 | B2 | 5/2006 | Meek, Jr. et al. |
| 7,072,737 | B2 | 7/2006 | Lunak et al. |
| 7,072,855 | B1 | 7/2006 | Godlewski et al. |
| 7,077,286 | B2 | 7/2006 | Shows et al. |
| 7,085,621 | B2 | 8/2006 | Spano, Jr. et al. |
| 7,092,796 | B2 | 8/2006 | Vanderveen |
| 7,093,755 | B2 | 8/2006 | Jordan et al. |
| 7,100,792 | B2 | 9/2006 | Hunter et al. |
| 7,103,419 | B2 | 9/2006 | Engleson et al. |
| 7,111,780 | B2 | 9/2006 | Broussard et al. |
| 7,139,639 | B2 | 11/2006 | Broussard et al. |
| 7,150,724 | B2 | 12/2006 | Morris et al. |
| 7,171,277 | B2 | 1/2007 | Engleson et al. |
| 7,218,231 | B2 | 5/2007 | Higham |
| 7,228,198 | B2 | 6/2007 | Vollm et al. |
| 7,249,688 | B2 | 7/2007 | Hunter et al. |
| 7,348,884 | B2 | 3/2008 | Higham |
| 7,417,729 | B2 | 8/2008 | Greenwald |
| 7,419,133 | B2 | 9/2008 | Clarke et al. |
| 7,426,425 | B2 | 9/2008 | Meek, Jr. et al. |
| 7,500,400 | B1 * | 3/2009 | Huber ............................ 73/795 |
| 7,554,449 | B2 | 6/2009 | Higham |
| 7,571,024 | B2 | 8/2009 | Duncan et al. |
| 7,588,167 | B2 | 9/2009 | Hunter et al. |
| 7,633,258 | B2 * | 12/2009 | Huber et al. .................. 318/646 |
| 2004/0104652 | A1 * | 6/2004 | Holmes et al. ............ 312/348.3 |

* cited by examiner

MEDICATION DISPENSING CABINET, COMPUTING DEVICE AND ASSOCIATED METHOD FOR MEASURING THE FORCE APPLIED TO A DRAWER

TECHNOLOGICAL FIELD

An example embodiment to the present invention relates generally to medication dispensing cabinets and, more particularly, to medication dispensing cabinet and associated computing devices and methods for measuring the force applied to a drawer.

BACKGROUND

Medication dispensing cabinets have been developed in order to store and controllably dispense a variety of medications. A medication dispensing cabinet may include a cabinet body with one or more drawers that are slidably disposed within the cabinet body. The drawers store the various medications. While some of the drawers may be unlatched and freely openable, other drawers may be locked in order to more closely control access to the medications stored in the locked drawers.

Some medication dispensing cabinets are automated and, as such, include or are otherwise associated with a computing device that controls access to the medication stored within the cabinet. The computing device may allow access to only authorized users, such as healthcare practitioners who work in the unit in which the medication dispensing cabinet is located. Once authorized by the computing device, a healthcare practitioner may identify a particular medication to be dispensed, such as by reference to the medications prescribed to a respective patient to whom the healthcare practitioner is attending. The computing device may then unlock the respective drawer in which the particular medication is stored so as to provide access to the medication. Once the healthcare practitioner has removed the medication from the first pocket, the drawer may be reinserted into the cabinet and locked.

A drawer of a medication dispensing cabinet is designed to be smoothly opened and closed. However, the repeated opening and closing of the drawers of a medication dispensing cabinet may cause the drawers to gradually require more force to open and close due to wear of the components that allow for the sliding movement of the drawer, intrusion of dirt or other contaminants that decrease the efficiency with which the drawer may be opened and closed or the like. This change in the force required to open and close the drawers of a medication dispensing cabinet may correspondingly increase the effort that must be expended by the healthcare practitioner who must repeatedly access medications stored by the medication dispensing cabinet.

Additionally, the drawers of a medication dispensing cabinet may sometimes be closed with an excessive amount of force, such as in instances in which a healthcare practitioner is in a hurry, is frustrated or otherwise. While medication dispensing cabinets may be constructed to withstand fairly substantial forces in conjunction with the closing of the drawers, the application of excessive amounts of force during the closure of a drawer, particularly on a repeated basis over the course of time, may accelerate the rate at which the medication dispensing cabinet wears or ages and, in some instances, may cause the medication dispensing cabinet to be damaged and to require repair, thereby requiring the medication dispensing cabinet to be taken out of service for some period of time. By way of example, the application of excessive force in conjunction with the closing of a drawer, may cause a lock associated with the drawer to break or otherwise be damaged. A broken or damaged drawer lock may require repair which may cause the medication dispensing cabinet to be temporarily taken out of service.

BRIEF SUMMARY

A medication dispensing cabinet, a computing device and an associated method are provided in order to measure the force applied to a drawer of a medication dispensing cabinet. By measuring and monitoring the force applied to the drawer of a medication dispensing cabinet, certain predefined condition(s) may be detected. For example, the closure of a drawer of a medication dispensing cabinet with an excessive amount of force may be detected. As another example, the gradual increase in the force required to open and close a drawer may be detected which may be indicative of the deterioration or other wear of the components of the drawer that provide for the slidable extension and retraction of the drawer. The medication dispensing cabinet, the computing device and associated method may, in some embodiments, provide a notification in an instance in which one or more predefined conditions are detected based upon the measurement of the force applied to the drawer in order to permit appropriate action to be taken in a timely manner. As such, the medication dispensing cabinet, the computing device and the associated method of an example embodiment may monitor the interaction that healthcare practitioners have with a medication dispensing cabinet so as to facilitate proper operation of the medication dispensing cabinet.

In one embodiment, a medication dispensing cabinet is provided that includes a cabinet body defining an internal cavity and a plurality of drawers disposed within the internal cavity of the cabinet body. The plurality of drawers are configured to be slidably opened and closed relative to the cabinet body. The medication dispensing cabinet of this embodiment also includes a force sensor, such as an accelerometer, carried by at least one of the cabinet body or one or more of the drawers and configured to measure force applied to a drawer of the medication dispensing cabinet.

The force sensor of one embodiment may be carried by a drawer and is configured to slidably move with the drawer relative to the cabinet body. In this embodiment, the drawer may include opposed front and rear ends with the front end facing outwardly from the cabinet body. As such, the force sensor of this embodiment may be mounted to the drawer proximate the rear end. The drawer may also include opposed sides with the force sensor being mounted to a central portion of the drawer between the opposed sides. The medication dispensing cabinet of one embodiment may also include a memory configured to store information relating to measurements of the force captured by the force sensor. The medication dispensing cabinet of one embodiment may also include a processor configured to monitor information relating to measurements of the force captured by the force sensor and to detect an instance in which the force applied to the drawer exceeds a predefined threshold.

In another embodiment, a computing device for association with a medication dispensing cabinet is provided. The computing device includes processing circuitry configured to receive an indication of force applied to the drawer of a medication dispensing cabinet, such as by receiving an indication of the force from a force sensor, e.g., an accelerometer, carried by at least one of the cabinet body or the drawer and configured to measure the force applied to the drawer. The processing circuitry of this embodiment may also be configured to cause storage of information relating to measurements of the force applied to the drawer and to process information relating to measurements of the force applied to the drawer to detect one or more predefined conditions.

The processing circuitry of one embodiment may be configured to process the information by detecting an instance in which the force applied to the drawer exceeds a predefined threshold. The processing circuitry may additionally or alternatively be configured to process the information by detecting an instance in which an average force applied to the drawer increases over time. In one embodiment, the processing circuitry is also configured to provide a notification in an instance in which a predefined condition is detected.

In a further embodiment, a method of monitoring a medication dispensing cabinet is provided that includes measuring force applied to a drawer of the medication dispensing cabinet. For example, the method may measure the force applied to the drawer with a force sensor, such as an accelerometer, carried by at least one of the cabinet body or the drawer. The method of this embodiment also causes storage of information relating to measurements of the force applied to the drawer and processes the information relating to measurements of the force applied to the drawer to detect one or more predefined conditions.

The method of one embodiment may process the information by detecting an instance in which the force applied to the drawer exceeds a predefined threshold. Additionally or alternatively, the method may process the information by detecting an instance in which the average force applied to the drawer increases over time. The method of one embodiment may also include providing a notification in an instance which a predefined condition is detected.

BRIEF DESCRIPTION OF THE DRAWINGS

Figure 1:
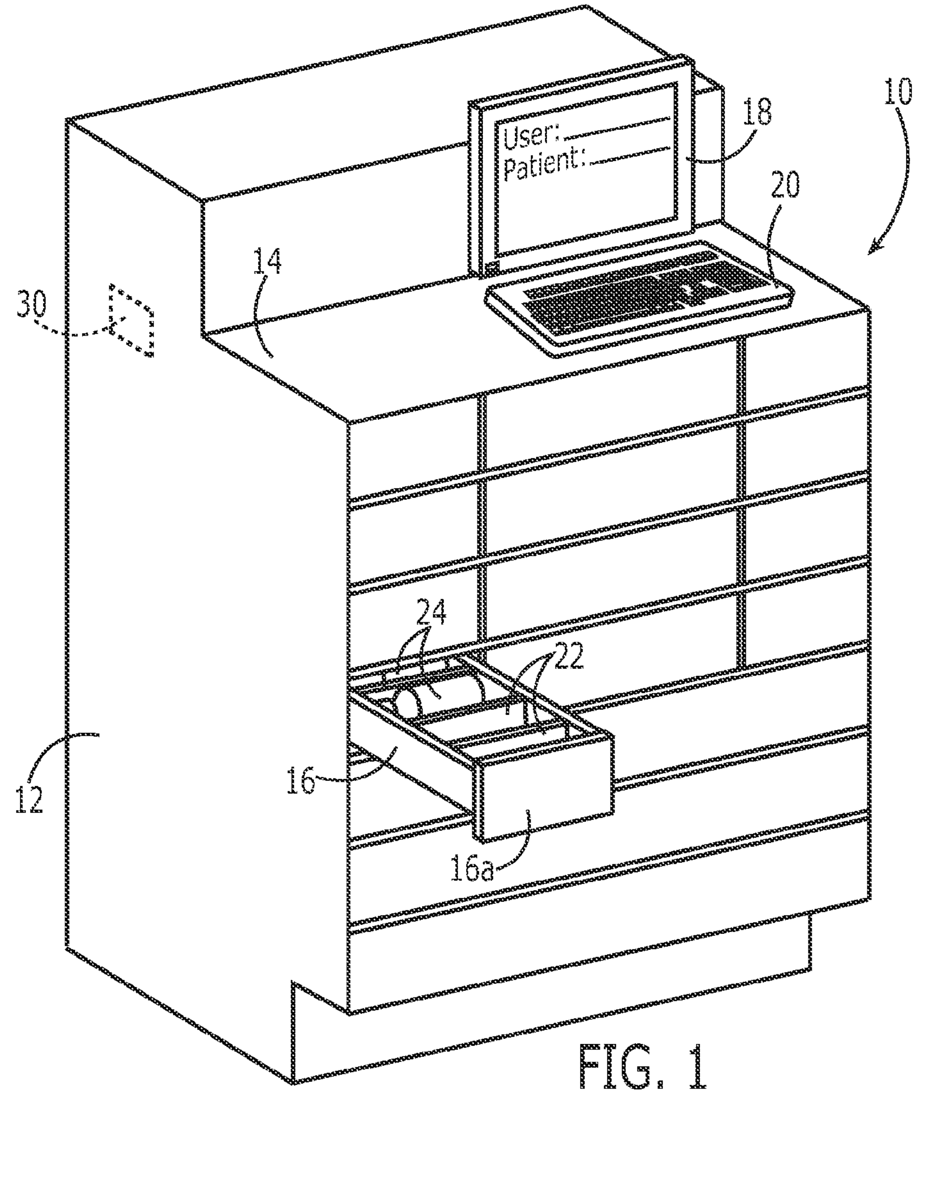
Figure 2:
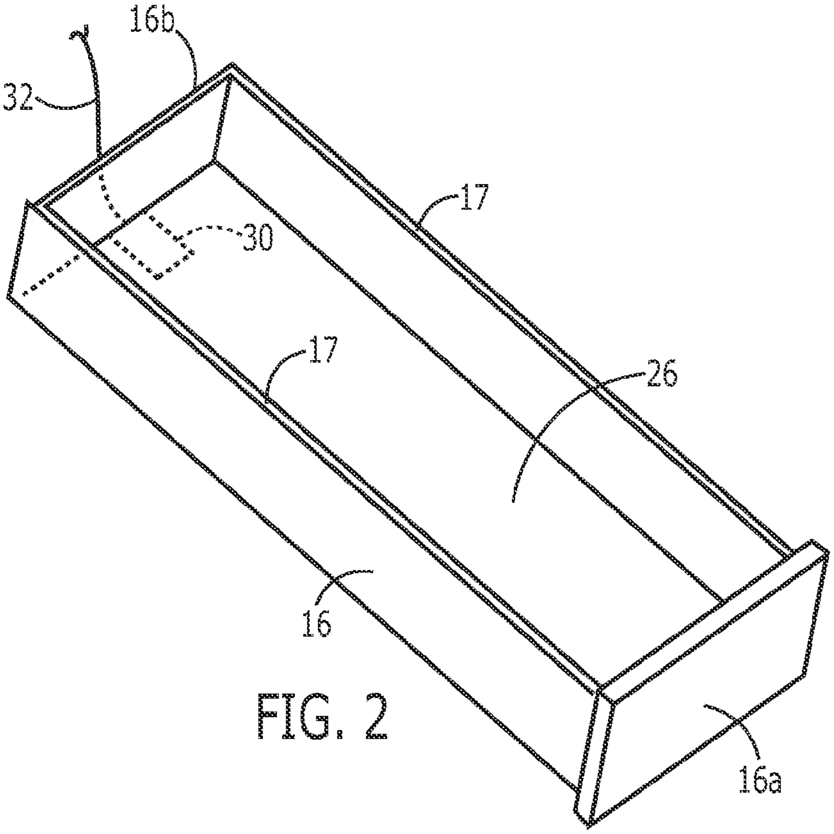
Figure 3:
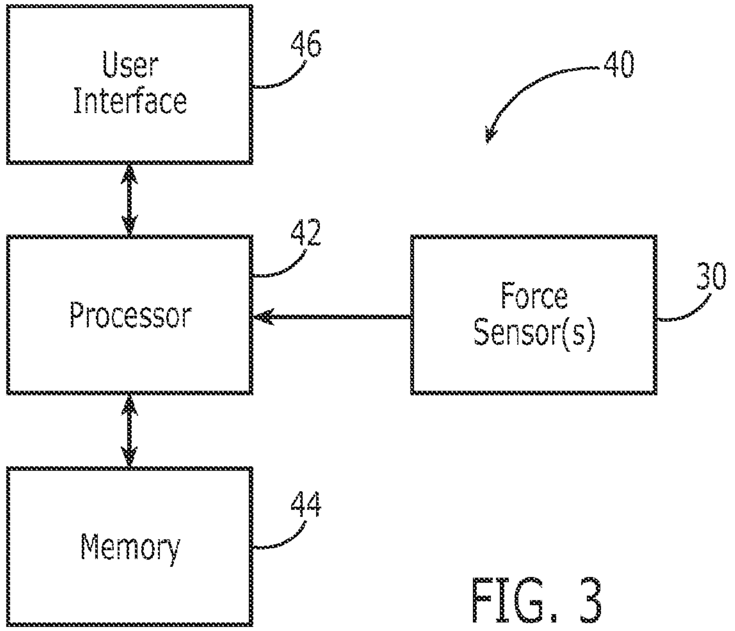
Figure 4:
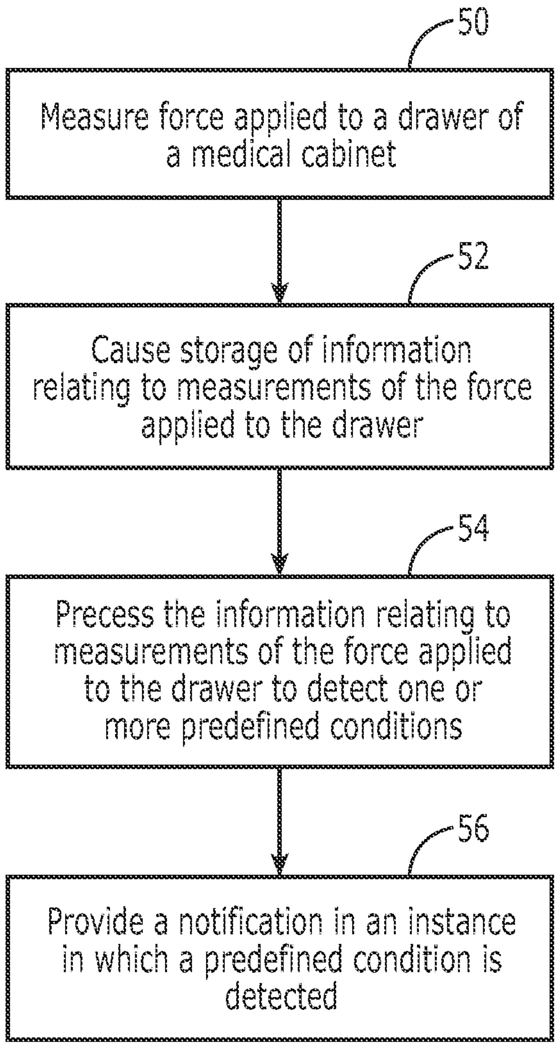

Having thus described certain example embodiments of the present disclosure in general terms, reference will hereinafter be made to the accompanying drawings, which are not necessarily drawn to scale, and wherein:

FIG. 1 is a perspective view of a medication dispensing cabinet in which one drawer is partially opened in accordance with an example embodiment to the present invention;

FIG. 2 is a perspective view of a drawer that carries a force sensor in accordance with an example embodiment of the present invention;

FIG. 3 is a block diagram of a computing device that may be specifically configured in accordance with an example embodiment of the present invention; and FIG. 4 is a flowchart illustrating the operations performed in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a cabinet 10 for storing a plurality of medications in accordance with one embodiment of the present invention is illustrated. As shown, the cabinet may include a cabinet body 12 having an upper work surface 14 and defining an internal cavity. The cabinet also includes one or more drawers 16 that are slideably disposed within the cabinet body, such as within the internal cavity defined by the cabinet body. The cabinet of one embodiment may be automated and, as such, may include a computing device, such as a personal computer, work station or the like, for controlling access to the medications stored by the cabinet. As shown in FIG. 1, the computing device may be carried by the cabinet and may include a display 18, a keyboard 20, processing circuitry (not shown) including or associated with a memory device, and the like. Alternatively, the computing device or at least the processing circuitry may be remote from the cabinet body, but may be associated with and in communication with the cabinet body and the drawers so as to control access to the plurality of medications.

As also shown in FIG. 1, once unlocked, a drawer 16 may be slideably extended relative to the cabinet body 12. In one embodiment, a drawer includes a plurality of pockets 22 or storage locations for the medication. While different medications may be stored in the different pockets, a drawer of one embodiment stores the same medication within each of the pockets. While the quantity of the medication stored in each pocket may vary, the drawer of one embodiment stores the same quantity of the same medication in each pocket, such as a unit or single dose of the medication. As shown in FIG. 1, for example, a bottle or other container 24 may be disposed within each respective pocket with the bottle containing a unit dose of the medication. However, the medication may be disposed in the pocket in other manners, such as by merely placing tablets, pills or the like within the pocket. The pockets of the illustrated embodiment have an open top and are therefore freely accessible once the drawer has been slideably extended from the cabinet body to such an extent that a bottle is exposed. Alternatively, one or more of the pockets may include a lid that, in some embodiments, may be latched or locked to further control access to the medications within the respective pocket.

Referring now to FIG. 2, a drawer 16 is shown in more detail. In the illustrated embodiment, the drawer extends lengthwise from a front end 16*a* to a rear end 16*b*. Additionally, the drawer extends laterally between opposed sides 17. The drawer also includes a floor 26 that supports the medications disposed therein and, although not shown in FIG. 2, may include one or more dividers as illustrated in FIG. 1 so as to subdivide the drawer into a plurality of pockets 22.

The medication dispensing cabinet 10 includes one or more force sensors 30 for measuring the force applied to a drawer 16 of the medication dispensing cabinet. As shown in FIG. 1, the force sensor may be mounted to and carried by the cabinet body 12. For example, the force sensor may be mounted to a side wall or rear wall of the cabinet body so as to measure the force to which the cabinet body is subjected upon closure of the drawer. Additionally or alternatively, one or more of the drawers may carry a force sensor. In this regard, a force sensor may be mounted to and carried by one or more of the drawers. In the embodiment illustrated in FIG. 2, for example, the force sensor may be mounted to the floor 26 of the drawer, so as to face downwardly, that is, so as to be carried by the opposite side of the floor from the medication. In the illustrated embodiment, the force sensor may be mounted to a central portion of the floor of the drawer between the opposed sides 17.

Additionally or alternatively, the force sensor may be mounted to the floor of the drawer proximate a rear end 16*b* of the drawer. The force sensor may be mounted to the cabinet body and/or the drawer(s) in various manners including by an adhesive, by a mechanical fastener or the like.

A medication dispensing cabinet 10 may include a single force sensor 30 carried by a respective drawer 16 or carried by the cabinet body 12. Alternatively, the medication dispensing cabinet may include a plurality of force sensors carried by a plurality of the drawers, such as a plurality of force sensors with one force sensor carried by each of the drawers and optionally also carried by the cabinet body. The medication dispensing cabinet may include a variety of different types of force sensors including, in one embodiment, an accelerometer.

The force sensor 30 may be configured to communicate with a computing device so as to provide an indication of the force applied to a drawer 16 of the medication dispensing cabinet 10. As shown in FIG. 2, the force sensor may communicate with the computing device via one or more wires 32. Alternatively, the force sensor and the computing device may communicate wirelessly. As such, the computing device may receive indications of the force applied to the drawer and may then detect one or more predefined conditions, such as an instance in which excessive force is applied to the drawers, an instance in which the average force required to open or close the drawer increases over time as may be indicative of wear or deterioration of the sliding mechanism of the drawer, intrusion of dirt or other contaminants into the sliding mechanism of the drawer, or the like.

One example of a computing device 40 that may be specifically configured to perform a sequence of operations in accordance with an example embodiment of the present invention is depicted in FIG. 3 and described below. However, it should be noted that some embodiments may include further or different components, devices or elements beyond those shown and described herein.

As shown in FIG. 3, the computing device 40 may include or otherwise be in communication with a processing system including, for example, processing circuitry that is configurable to perform actions in accordance with example embodiments described herein. The processing circuitry may be configured to perform data processing, application execution and/or other processing and management services. The processing circuitry may include a processor 42 and memory 44 that may be in communication with or otherwise control a user interface 46, such as a display 18 and/or a keyboard 20, as shown in FIG. 1.

In an example embodiment, the memory 44 may include one or more non-transitory memory devices such as, for example, volatile and/or non-volatile memory that may be either fixed or removable. The memory may be configured to store information, data, applications, instructions or the like for enabling the computing device 40 to carry out various functions in accordance with example embodiments of the present invention. For example, the memory could be configured to buffer input data for processing by the processor 42. Additionally or alternatively, the memory could be configured to store instructions for execution by the processor.

The processor 42 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 44 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The user interface 46 may be in communication with the processing circuitry to receive an indication of a user input and/or to provide an audible, visual, mechanical, or other output to a user. In one embodiment, the user interface may include, for example, a keyboard 20, a mouse, a joystick, a display 18, a touch screen display, a microphone, a speaker, and/or other input/output mechanisms. The user interface may be in communication with the memory 44, such as via a bus.

Referring now to FIG. 4, the operations performed by the medication dispensing cabinet 10 and, in one embodiment, by a computing device 40 in association with the medication dispensing cabinet are depicted. As shown in block 50 of FIG. 4, force applied to a drawer 16 of the medication dispensing cabinet may be measured by a force sensor 30, such as an accelerometer. The force sensor may then provide an indication of the force applied to the drawer of the medication dispensing cabinet to the computing device 40, such as the processor 42, such that the computing device receives the indication of the force applied to the drawer. This indication may be provided on a periodic basis or may be triggered by the measurement of a force applied to the drawer, such as a force that exceeds a predefined minimum threshold.

Information relating to the measurements of the force applied to the drawer 16 may then be stored. For example, the processing circuitry of the computing device 40 may cause information relating to the measurements of the force to be stored in memory 44. See block 52 of FIG. 4. The information relating to the measurements of the force applied to the drawer may be stored for a variety of reasons including providing historical information relating to the usage of the medication dispensing cabinet 10 over time. Based upon the information that is stored relating to measurements of the force applied to the drawer, warranty claims associated with a damaged or defective medication dispensing cabinet may be investigated to determine the likelihood that the damage or defect was caused by the application of excessive force to the drawer of the medication dispensing cabinet. Additionally or alternatively, the information relating to the measurements of the force applied to the drawer may be stored in memory in order to facilitate a comparison of the average force now required to close a drawer to the average force required in the past to close the same drawer with changes, such as increases in the force applied to the drawer, being indicative of wear or other deterioration of the sliding mechanism associated with the drawer or the intrusion of dirt or other contaminants in the sliding mechanism that may be the subject of maintenance. Still further, the information that is stored relating to measurements of the force applied to the drawer may also be utilized in order to detect the instances in which the medication dispensing cabinet may have been tampered with, such as an instance in which an unauthorized person may have attempted to pry open a drawer of the medication dispensing cabinet.

The medication dispensing cabinet 10 and, in one embodiment, the processing circuitry, e.g., the processor 42, of the computing device 40 associated with the medication dispensing cabinet may be configured to process the information relating to measurements of the force applied to the drawer 16 to detect one or more predefined conditions. See block 54 of FIG. 4. For example, the processing circuitry may compare the force applied to a drawer with a predefined threshold in order to detect an instance in which an excessive amount of force was applied to the drawer, such as in an instance in which the drawer was slammed shut. The predefined threshold may be a static or fixed value that is greater than the force required to shut the drawer. Alternatively, the predefined threshold may be defined in terms of the average force applied to close the drawer over time, thereby taking into account wear or other deterioration of the sliding mechanism of the drawer which may cause the force required to shut the drawer to increase over time. For example, the predefined threshold may equal a predefined percentage greater than 100%, e.g., 125%, 150%, 200%, etc., of the average force required to close the drawer. In regards to determining the average force to close the drawer over time for purposes of determining the predefined threshold, the computing device, such as the processor, may determine the average of the most recent measurements of the force required to shut the drawer that are stored in memory 44, such as the average of a predetermined number of the most recent measurements or the average of the measurements that have been collected within a predetermined period of time. Additionally or alternatively, the processing circuitry may be configured to determine the average force applied to the drawer over time and to determine whether the average force applied to the drawer increases over time, such as by more than a predefined percentage, which may indicate wear or deterioration of the sliding mechanism associated with the drawer or the intrusion of dirt or other contaminants in the sliding mechanism, which may require maintenance.

Based upon the processing of the information relating to the measurements of force applied to the drawer 16, the processing circuitry, e.g., the processor 42, of one embodiment may also be configured to provide a notification in an instance in which a predefined condition is detected. See block 56 of FIG. 4. A variety of different types of notifications may be provided including the generation of a report that identifies each instance in which the predefined condition was detected, the annunciation of an alert, such as an audible alert provided by speakers associated with the computing device 40 or a visual alert, such as provided by display 18 associated with the computing device.

In addition to measuring the force applied to the drawer 16 of a medication dispensing cabinet 10, the processing circuitry, such as the processor 42, of the computing device 40 may capture additional information. In one embodiment, the medication dispensing cabinet or at least certain drawers of the medication dispensing cabinet are locked and a healthcare practitioner must identify himself/herself to the computing device, such as by entry of a user name and password or by scanning of a barcode or other type of code carried by the practitioner, so as to be authorized to access the contents of the medication dispensing cabinet. In this embodiment, the processing circuitry, such as the processor, may also be configured to identify the healthcare practitioner that was authorized to access the medication dispensing cabinet at the time that the force applied to the drawer was determined to satisfy a predefined condition, such as at the time that excessive force was applied to shut the drawer. Thus, the processing circuitry may not only store information relating to the force applied to the drawer, but may also store, in association therewith, information relating to the healthcare practitioner who was authorized to access the medication dispensing cabinet at the time that the force was applied. As such, remedial action or other follow-up may be conducted with healthcare practitioners who are determined to repeatedly apply excessive force to shut the drawer of a medication dispensing cabinet in order to remind the healthcare practitioner that the use of such excessive force may damage the medication dispensing cabinet.

A medication dispensing cabinet 10 that includes a force sensor 30, such as an accelerometer, may also be utilized for a variety of other purposes. For example, the accelerometer may capture and provide information to the computing device 40 that permits the movement of a medication dispensing cabinet to be tracked and to provide an estimate of the distance that the medication dispensing cabinet was moved. Detecting the movement of the medication dispensing cabinet may be useful as the computing devices of some medication dispensing cabinets may be configured to communicate wirelessly with other computing systems. As such, the medication dispensing cabinet including the computing device may preferably be positioned at a location that has good wireless connectivity and the computing device may be configured to detect movement of the medication dispensing cabinet to another location that may limit or even eliminate the wireless communications capability of the computing device associated with the medication dispensing cabinet.

As noted above, FIG. 4 is a flowchart illustrating the operations performed by a method, apparatus and computer program product, such as computing device 40 of FIG. 3, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 44 of a computing device employing an embodiment of the present invention and executed by a processor 42 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 4, when executed, convert a computer or processing circuitry into a particular machine configured to perform an example embodiment of the present invention. Accordingly, the operations of FIG. 4 define an algorithm for configuring a computer or processing circuitry, e.g., processor, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A medication dispensing cabinet comprising:

a cabinet body defining an internal cavity;

a plurality of drawers comprising a plurality of pockets configured to store medication disposed within the internal cavity of the cabinet body and configured to be slidably opened and closed relative to the cabinet body;

a force sensor carried by at least one of the cabinet body or one or more of the drawers and configured to measure force applied to a drawer of the medication dispensing cabinet; and processing circuitry providing a notification in response to one or more predefined conditions being detected by the force sensor, wherein at least one of the one or more predefined conditions comprises an increase in average force over time.

2. A medication dispensing cabinet according to claim 1 wherein the force sensor is carried by a drawer and is configured to slidably move with the drawer relative to the cabinet body.

3. A medication dispensing cabinet according to claim 2 wherein the drawer includes opposed front and rear ends with the front end facing outwardly from the cabinet body, and wherein the force sensor is mounted to the drawer proximate the rear end.

4. A medication dispensing cabinet according to claim 2 wherein the drawer includes opposed sides, and wherein the force sensor is mounted to a central portion of the drawer between the opposed sides.

5. A medication dispensing cabinet according to claim 1 wherein the force sensor comprises an accelerometer.

6. A medication dispensing cabinet according to claim 1 further comprising a memory configured to store information relating to measurements of the force captured by the force sensor.

7. A medication dispensing cabinet according to claim 1 wherein the processing circuitry is configured to monitor information relating to measurements of the force captured by the force sensor and wherein at least one of the one or more predefined conditions comprises an instance in which the force applied to the drawer exceeds a predefined threshold.

8. A computing device for association with a medication dispensing cabinet, the computing device comprising processing circuitry configured to:

receive an indication of force applied to a drawer of the medication dispensing cabinet;

cause storage of information relating to measurements of the force applied to the drawer; and process the information relating to measurements of the force applied to the drawer to detect one or more predefined conditions wherein at least one of the one or more predefined conditions comprises an increase in average force over time, wherein the drawer comprises a plurality of pockets configured to store medication.

9. A computing device according to claim 8 wherein the processing circuitry is configured to process the information by detecting an instance in which the force applied to the drawer exceeds a predefined threshold.

10. A computing device according to claim 8 wherein the processing circuitry is further configured to provide a notification in an instance in which a predefined condition is detected.

11. A computing device according to claim 8 wherein the processing circuitry is configured to receive an indication of the force from a force sensor carried by at least one of the cabinet body or the drawer and configured to measure the force.

12. A computing device according to claim 11 wherein the force sensor comprises an accelerometer.

13. A method of monitoring a medication dispensing cabinet comprising:

measuring force applied to a drawer of the medication dispensing cabinet;

causing storage of information relating to measurements of the force applied to the drawer; and processing the information relating to measurements of the force applied to the drawer to detect one or more predefined conditions wherein at least one of the one or more predefined conditions comprises an increase in average force over time, wherein the drawer comprises a plurality of pockets configured to store medication.

14. A method according to claim 13 wherein processing the information comprises detecting an instance in which the force applied to the drawer exceeds a predefined threshold.

15. A method according to claim 13 further comprising providing a notification in an instance in which a predefined condition is detected.

16. A method according to claim 13 wherein measuring the force applied to the drawer comprises measuring the force applied to the drawer with a force sensor carried by at least one of the cabinet body or the drawer.

17. A method according to claim 16 wherein the force sensor comprises an accelerometer.

* * * * *